United States Patent
Ahrens

[15] 3,675,967
[45] July 11, 1972

[54] TRUCK WITH SLIDING ROOF

[72] Inventor: William J. Ahrens, Route 3, Sauk Center, Minn. 56378

[22] Filed: July 27, 1970

[21] Appl. No.: 58,432

[52] U.S. Cl..............................296/137 B, 49/358, 49/360, 52/66, 296/100, 296/137 G
[51] Int. Cl. ......................................................B60j 7/02
[58] Field of Search...........296/100, 137, 105, 137 F, 137 G, 296/137 H, 137 B, 137 E; 49/358, 360; 52/66; 160/193

[56] References Cited

UNITED STATES PATENTS

| | | |
|---|---|---|
| 2,014,140 | 9/1935 | Larsen................................296/100 X |
| 2,496,437 | 2/1950 | Bramble.................................296/105 |
| 3,292,971 | 12/1966 | Zucker...................................296/137 |
| 2,160,366 | 5/1939 | Marchenko....................196/137 G X |
| 2,667,379 | 1/1954 | Baze.......................................296/102 |

FOREIGN PATENTS OR APPLICATIONS

| | | |
|---|---|---|
| 212,679 | 5/1967 | Sweden...............................296/137 E |
| 733,448 | 3/1943 | Germany............................296/137 F |
| 138,743 | 9/1950 | Australia .................................49/360 |

Primary Examiner—Kenneth H. Betts
Assistant Examiner—Winston H. Douglas
Attorney—Williamson, Palmatier & Bains, H. Dale Palmatier, Herman H. Bains and Malcolm L. Moore

[57] ABSTRACT

A truck having a cargo carrying compartment behind a cab is provided with a covering roof slidably supported over the cargo compartment on side panels of such a height as to permit the roof to be shifted forwardly over the cab to expose substantially the entire interior of the cargo compartment. Interlocking, J-shaped guide rails on the roof and cargo compartment side panels prevent vertical or lateral movement of the roof with respect to the side panels.

2 Claims, 4 Drawing Figures

PATENTED JUL 11 1972 3,675,967

INVENTOR.
WILLIAM J. AHRENS
BY Williamson, Palmatier
& Bains
ATTORNEYS

TRUCK WITH SLIDING ROOF

BRIEF SUMMARY OF THE INVENTION

This invention is directed to a roof covering for trucks, especially for medium size and pickup trucks, and is particularly characterized by a sliding roof mounted over the cargo compartment of a truck in such a way as to be shiftable forwardly over the truck cab a sufficient distance to render substantially the entire cargo compartment accessible. The roof and its sliding support are so constructed as to provide a weather seal along both sides of the roof at its sliding joint with the cargo compartment body and while positively restraining the roof against vertical displacement or tipping movement even when it is shifted forwardly all the way over the truck cab to fully expose the cargo compartment.

These basic objectives have been realized by providing the cargo compartment of a truck with upright side panels which are at least as high as the top of the truck cab and slidably supporting a roof directly on top of the side panels, interlocking guide rails on the roof and on the side panels being utilized to hold the roof against vertical, tipping movement or lateral displacement with respect to the cargo compartment side panels regardless of the extent to which the roof is forwardly shifted on the side panels. In the preferred embodiment of my invention, the guide rails take the form of elongated, J-shaped members with upwardly turned hooked end portions on the roof guide rails being interlocked with downwardly turned hooked end portions at the top of the side panel guide rails to thereby prevent the vertical displacement of the roof with respect to the cargo compartment.

A particularly advantageous feature of my truck roof structure contributing to the ease of installation and removal thereof resides in the provision of downwardly depending side walls on opposite sides of the roof top, the roof side walls being coplanar with the upright side panels of the truck cargo compartment and slidably supported on the top surface thereof. The aforesaid guide rails are attached to the inside surface of the roof side walls and the cargo compartment side panels, the hooked, upper end of the J-shaped guide rails on the truck side panels having a horizontally extending portion which slidably supports an inwardly projecting shoulder on the aforesaid side walls of the roof structure.

As a further beneficial aspect of my truck roof structure, I employ an elongated sealing skirt on the outside surface of each of the aforesaid roof side walls extending therebelow in sliding contact with the outside surface of each of the cargo compartment side panels to thereby serve as a weather seal extending over the joint between the roof structure and the cargo compartment side panels.

These and other objects and advantages of my invention will become readily apparent as the following description is read in conjunction with the accompanying drawings wherein like reference numerals have been used to designate like elements throughout the several views.

DESCRIPTION OF THE PREFERRED EMBODIMENT

Figure 1:
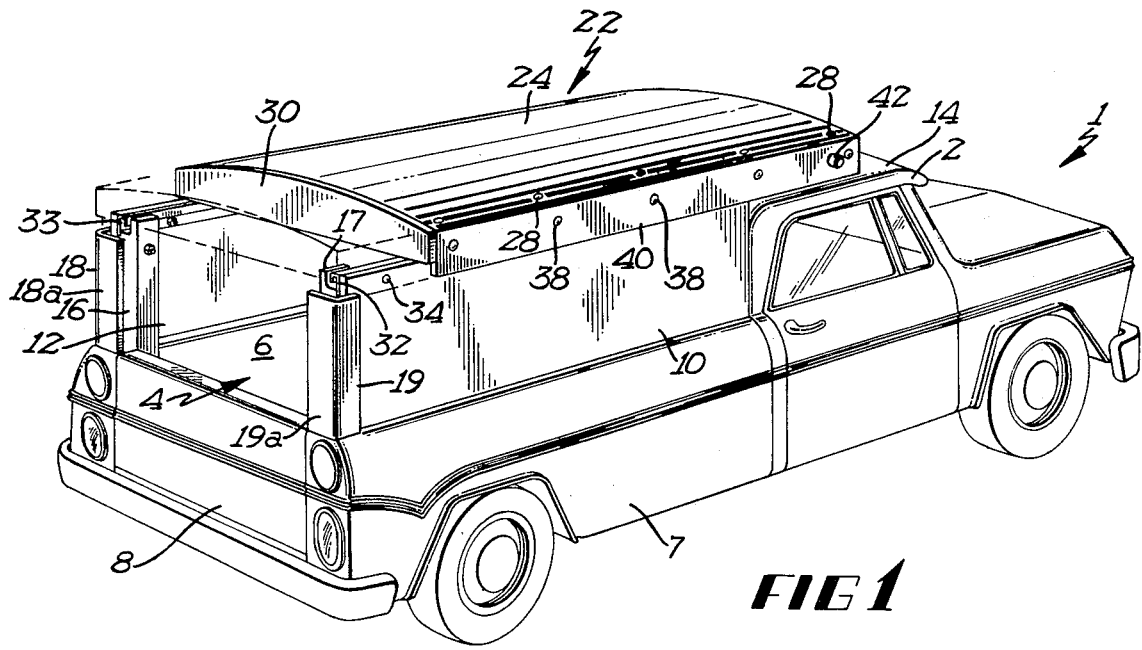
FIG. 1 is a perspective view showing the sliding roof structure of this invention mounted on the cargo compartment of a truck.

The roof structure of this invention has been particularly designed with a view towards the convenient and easy mounting thereof on relatively small trucks having a cargo carrying compartment located behind a driver's cab. For illustrative purposes, I hAve shown such a truck in the form of a commonly known pickup truck in FIG. 1. The truck is designated generally by reference numeral 1 and includes a cab 2 and a rear, cargo compartment 4. The conventional structure of pickup truck 1 includes longitudinally extending, body side panels 6 and 7 which define cargo compartment or space 4 therebetween, tail gate 8 being provided at the rear end of panels 6 and 7.

Figure 4:
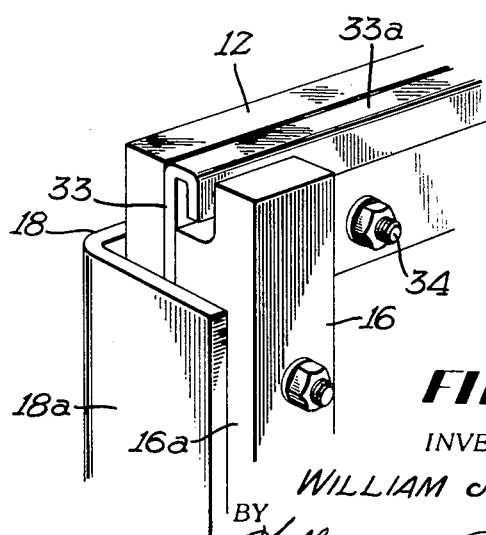
FIG. 4 is a fragmentary, perspective view showing a rear corner of the truck cargo compartment.

For purposes of my invention, cargo compartment 4 is modified to give it a greater height by providing upright, side panel extensions 10 and 12 on top of body side panels 6 and 7. Side panel extensions 10 and 12 extend upwardly to a height at least even with the top 14 of truck cab 2. Preferably, the upper extremities of panel extensions 10 and 12 are located slightly above the top 14 of truck cab 2 for reasons hereinafter explained. Provision is also made for an upward extension of tail gate 8, and this is accomplished by bolting corner posts 16 and 17 to the rear ends of side panel extensions 10 and 12 in the upright arrangement shown in FIGS. 1, 2 and 4. Posts 16 and 17 are bolted to the inside surface of side panel extensions 10 and 12 with their rear faces flush with the upright, rear edges of the side panel extensions. Right angle guide braces 18 and 19 are bolted to the outside surfaces of side panel extensions 10 and 12 and extend rearwardly therefrom with one of their angle plates 18a and 19a extending parallel to the rear faces 16a and 17a of posts 16 and 17 and defining therebetween a space within which an end gate extension 20 (FIG. 2) is slidably received. When inserted in place in the manner shown in solid lines in FIG. 2, end gate extension 20 will be abutting against the top of tail gate 8 and will be in vertical alignment therewith to provide a continuous end closure for the rear end of cargo compartment 4.

Figure 3:
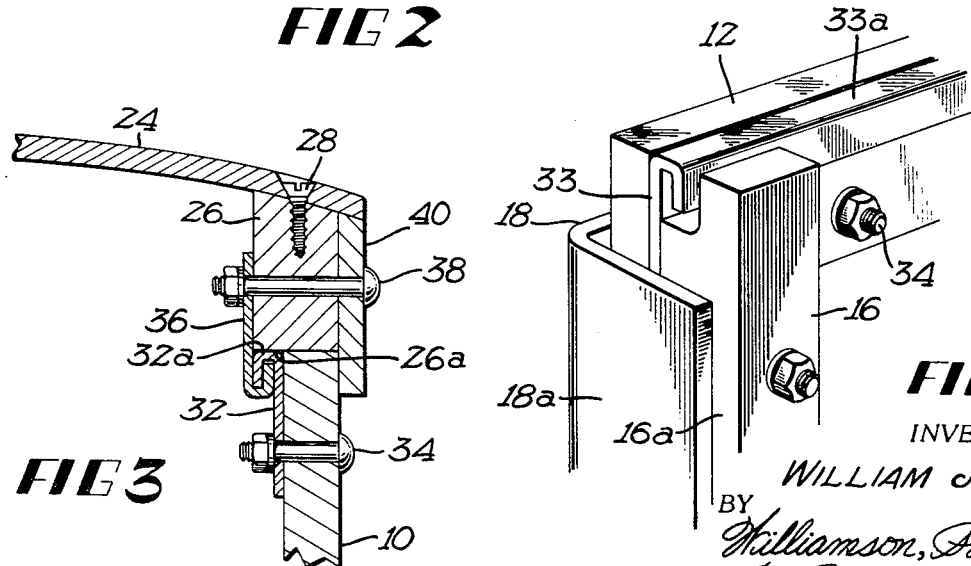
FIG. 3 is a vertical section view of the roof structure taken along lines 3—3 of FIG. 2.

Supported on top of side panel extensions 10 and 12 is a longitudinally shiftable roof structure 22 comprised of a horizontally extending top wall portion 24 and a pair of opposed side walls depending downwardly from the lateral edges thereof, only one of which is shown at 26 in FIGS. 1 and 3. Roof 22, as well as side wall extensions 10 and 12 are preferably made of wood, the roof side walls being fastened to top wall 24 by screws 28. As may be noted most clearly with respect to roof side wall 26 in FIG. 3, the roof side walls are substantially coplanar with upright side panel extensions 10 and 12 of cargo compartment 4 and rest upon the top surfaces thereof. In this manner, side panel extensions 10 and 12 serve as sliding supports for roof structure 22. Cross braces 30 and 31 extend across the opposite ends of roof 22 between the opposed side walls thereof and are arcuately shaped on their upper edges to conform to the arcuate shape of top wall 24.

In order to secure roof structure 22 on side panel extensions 10 and 12 I provide two pairs of interlocking guide rails on the roof side walls and on side panel extensions 10 and 12. A first pair of guide rails 32 and 33 are affixed to the top of side panel extensions 10 and 12 by means of a plurality of bolts 34 extending therethrough. Guide rails 32 and 33 are preferably of inverted, J-shaped configuration, as appears most clearly in FIGS. 3 and 4, with downwardly turned, hooked end portions at the top thereof. The hooked end portions of guide rails 32 and 33 include horizontally extending segments 32a and 33a substantially flush with and in horizontal alignment with the top surfaces of side panel extensions 10 and 12. A second pair of longitudinal guide rails are affixed to the roof side walls, one of which is shown at 36 in FIG. 3 attached to side wall 26 by a plurality of through bolts 38. Guide rail 36 is also J-shaped and is attached to the inside surface of side wall 26 with its upwardly turned hooked end portion at the lower end thereof interlocked with the hooked upper end of guide rail 32 on truck side panel 10 in sliding engagement therewith. By virtue of the interlocking arrangement of the J-shaped guide rails on roof structure 22 and side panel extension 10 and 12, roof 22 is secured against vertical and lateral displacement with respect to side panel extensions 10 and 12.

In order to provide a sliding seal at the joint between roof structure 22 and side panel extensions 10 and 12 of the cargo compartment 4, an elongated sealing skirt is attached to the opposite sides of roof structure 22. The sealing skirts are elongated members, one of which is shown at 40 in FIGS. 1 and 3 attached to the outside surface of roof side wall 26. Bolts 38 serve to hold sealing skirt 40 as well as guide rail 36 to roof side wall 26. Skirt 40 depends downwardly from roof top wall 24 below the bottom surface of side wall 26 and overlies the outer, top surface of side panel extension 10 in the arrangement shown in FIG. 3. The outside surfaces of roof side wall 26 and side panel extension 10 are in vertical alignment, and sealing skirt 40 overlaps the joint between side wall 26 and side panel 10 in sliding contact with the outside surface of side panel 10. Thus, as roof structure 22 is slidably shifted back and forth on top of side panel extensions 10 and 12, sealing skirts 40 provide a weather seal to prevent the entry of rail and moisture through the joint between roof 22 and side panels 10 and 12.

It is also noteworthy that the roof side walls are of greater thickness than side panel extensions 10 and 12, as is indicated with respect to side wall 26 in FIG. 3. Thus, the inside surface of side wall 26 is disposed inwardly beyond the inside surface of side panel 10, thereby providing a horizontal shoulder 26a on the underside of side wall 26. With guide rail 36 depending below the bottom surface of side wall 26, shoulder 26a will be slidably supported on horizontal segment 32a of guide rail 32 which is flush with the top surface of side panel extension 10. By virtue of this structural arrangement of roof 22 and side panel extensions 10 and 12, the J-shaped guide rails not only securely restrain roof 22 against vertical and lateral displacement, but also the horizontal segments 32a and 33a of lower guide rails 32 and 33 provide a sliding support for a portion of the roof side walls.

Figure 2:
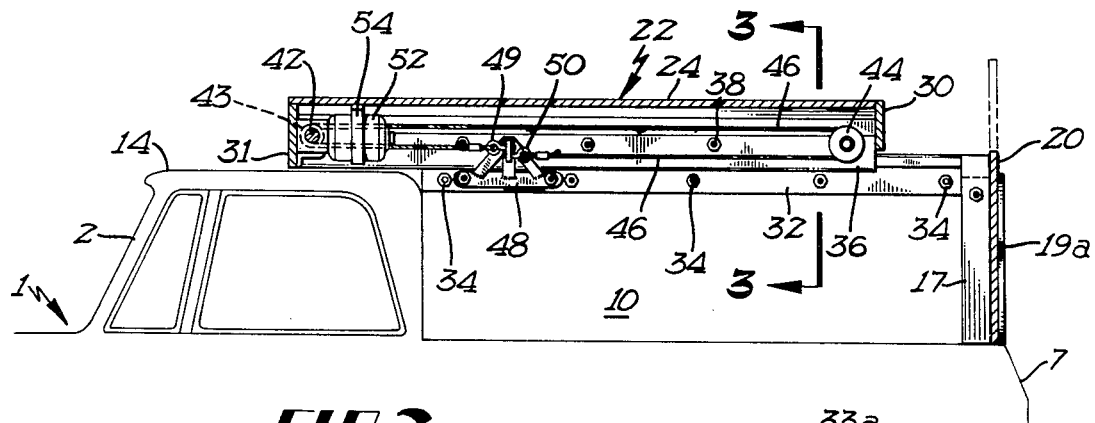
FIG. 2 is a side elevation view of the truck of FIG. 1 with the roof structure in section.

Side panel extensions 10 and 12 are of such a height that when roof structure 22 is shifted forwardly in the manner shown in FIGS. 1 and 2 it will clear top surface 14 of truck cab 2. Side panel extensions 10 and 12 must support roof structure 22 at a high enough level that a clearance space will be provided between the lower edge of downwardly depending sealing skirts 40 and the top surface 14 of cab 2, as is indicated in FIG. 2. Access maybe obtained to the interior of cargo space 4 by slidably shifting roof 22 forwardly on top of side panel extensions 10 and 12. Because of the locking engagement of the upper guide rails attached to the roof side walls with lower guide rails 32 and 33 on side panel extensions 10 and 12, roof structure 22 will be positively restrained against vertical, tipping movement, even when it is shifted forwardly all of the way to the forward end of side panel extensions 10 and 12 to expose substantially the entire length of cargo compartment 4 for unloading and loading purposes. It will be appreciated that the roof 22 shifted all of the way forwardly over truck cab 2, the tendency of the unsupported forward end of roof 22 to tip downwardly will be resisted by the locking engagement of the roof guide rails with guide rails 32 and 33 on the cargo compartment side panels.

Although the forward and rearward slidable shifting of roof 22 can be accomplished by simply pushing back and forth on the roof, I prefer to provide power means for this purpose. To that end, a drive shaft 42 is rotatably supported between the opposed side walls of roof structure 22, one end of shaft 42 being shown extending through side wall 40 in FIG. 1. A cable winding rotor 43 is mounted on drive shaft 42 for rotation therewith, and a guide pulley 44 is longitudinally spaced from rotor 43 on the opposite end of roof side wall 40. Cable 46 is wound around rotor 43 on drive shaft 42 and is guided around pulley 44, the free ends of cable 46 being attached to a cable holding bracket 48 rigidly secured to the inside surface of side panel extension 10. Eye-bolts 49 and 50 serve as coupling means for securing the ends of cable 46 to bracket 48. Drive shaft 42 could be rotated by means of a crank attached to the outer end thereof shown in FIG. 1. However, an electric drive motor 52 is preferably utilized for this purpose. Motor 52 is secured to the forward end of roof structure 22 by a mounting bracket 54 and drives shaft 42 by means of a reducing gear arrangement of conventional design which has not been shown. Preferably, a second cable and pulley arrangement, together with a second holding bracket are mounted on the other side wall of roof structure 22 opposite side wall 26. The use of two cables in such an arrangement driven from the opposite ends of shaft 42 insures the smooth and relatively rapid sliding movement of roof 22 back and forth over cargo space 4. Motor 52 is necessarily reversible to rotate shaft 42 in the proper direction for sliding roof 22 in a forward or rearward direction. With drive shaft 42 rotating in a counter clockwise direction as viewed in FIG. 2, roof 22 will be shifted forwardly to uncover cargo space 4.

It will readily be appreciated that the entire roof structure 22 may easily be installed or removed by slidably engaging the complementary, J-shaped guide rails and resting the side walls of the roof structure on top of side panel extensions 10 and 12. The installation or removal of roof 22 is accomplished from the forward end of truck 1. By providing for the forward, sliding movement of roof 22, the roof structure does not interfere in any way with the loading or unloading of cargo compartment 4, as would be the case with a rearwardly shiftable roof. A forward end gate extension, not shown, is preferably utilized at the forward end of cargo compartment 4 to fully enclose the cargo space when roof 22 is shifted rearwardly to its fully closed position shown in phantom lines in FIG. 1.

I contemplate that various changes may be made in the size, shape and arrangement of the various component parts of my sliding roof structure without departing from the spirit and scope of my invention as defined by the following claims.

I claim:

1. A slidably shiftable roof structure for a truck comprising in combination:

a truck having a cab and a rear, cargo carrying compartment formed by a floor and two laterally spaced, upright side panels;

a covering roof over said cargo carrying compartment, said roof including a generally horizontal top wall and a pair of opposed side walls depending downwardly from the lateral edges thereof, said side walls being coplanar with said upright side panels and slidably supported directly thereon, and said roof side walls being of greater thickness than said side panels with the vertical surfaces of said side walls and side panels on one side thereof being in vertical alignment and the vertical surface on the opposite side of said side walls being laterally offset beyond the adjacent vertical surface of said side panels so as to define a pair of planar, horizontal shoulders on the bottom surface of each of said side walls laterally offset from the top surface of each of said side panels;

a first pair of longitudinal guide rails affixed to the top of said side panels on the side thereof underlying said horizontal shoulders, said guide rails being of inverted, J-shaped configuration with downwardly turned, hooked end portions including a horizontal segment at the top thereof horizontally aligned with the top surface of each of said side panels, and said horizontal shoulders abutting against said horizontal guide rail segments in sliding engagement therewith; and a second pair of longitudinal guide rails affixed to said laterally offset vertical surfaces of said roof side walls, said second guide rails being J-shaped and having upwardly turned, hooked end portions at their lower ends interlocked with said first guide rails in sliding engagement therewith, whereby said roof is secured against vertical and lateral displacement with respect to said side panels.

2. A slidably shiftable roof structure as defined in claim 1 wherein:

the outer surfaces of said side walls and said side panels are in vertical alignment, and the inside vertical surfaces of said side walls are laterally offset inwardly beyond the inside vertical surfaces of said side panels, whereby said horizontal shoulders are located on the inside of said side walls;

said first pair of guide rails are affixed to the inside, vertical surfaces of said side panels with said hooked end portions thereof opening inwardly and said horizontal segments thereof extending inwardly from the inside vertical surfaces of said side panels in underlying relation to said horizontal shoulders of said side walls; and said second pair of longitudinal guide rails are affixed to the inside vertical surfaces of said side walls with said hooked end portions thereof opening outwardly and depending downwardly below the bottom surfaces of said side walls in interlocking engagement with said hooked end portions of said first pair of guide rails.

* * * * *